July 20, 1965
R. W. NORTON
3,195,861
TANDEM TAXI TENDER FOR AIRPLANES
Filed April 11, 1963
7 Sheets-Sheet 2
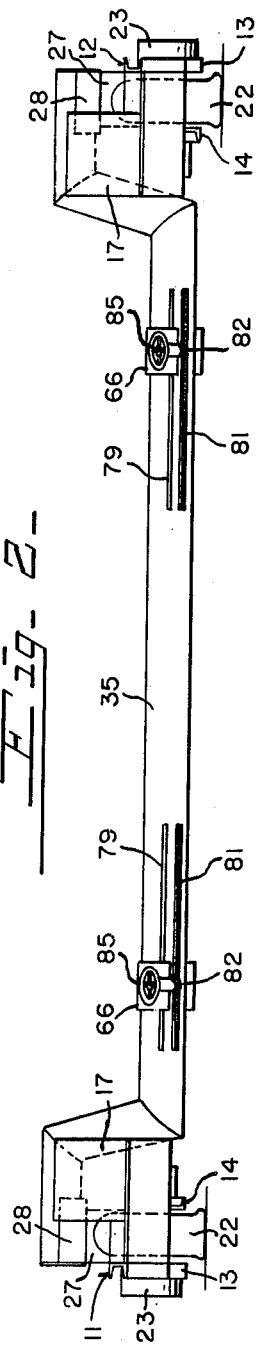
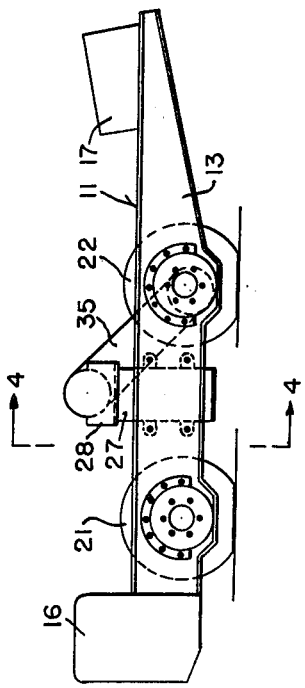
INVENTOR.
RICHARD W. NORTON.
BY
ATTORNEY.

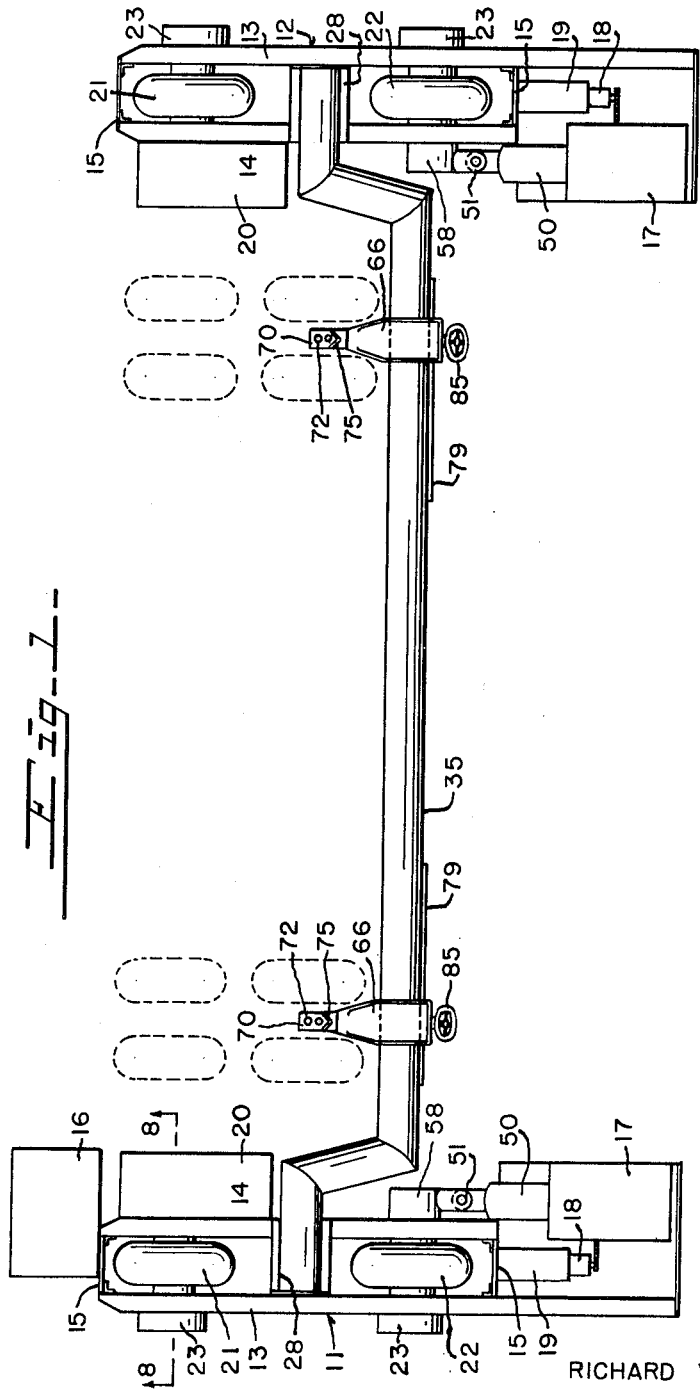

July 20, 1965
R. W. NORTON
3,195,861
TANDEM TAXI TENDER FOR AIRPLANES
Filed April 11, 1963
7 Sheets-Sheet 3
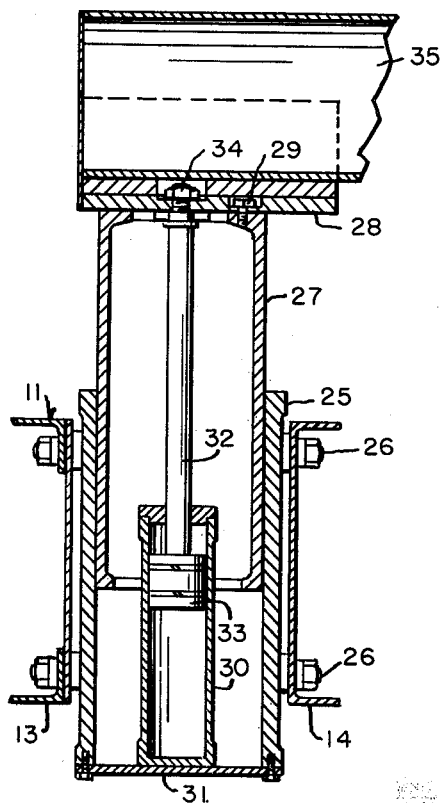
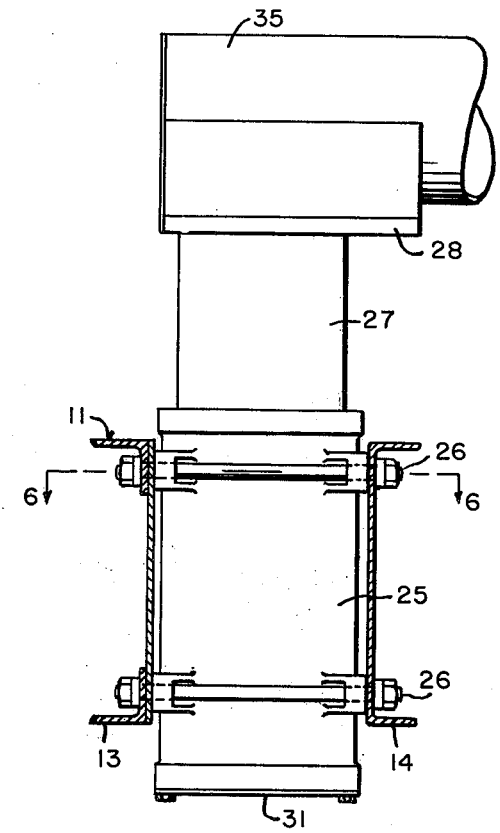
INVENTOR.
RICHARD W. NORTON.
BY
*H.C. Karl.*
ATTORNEY.

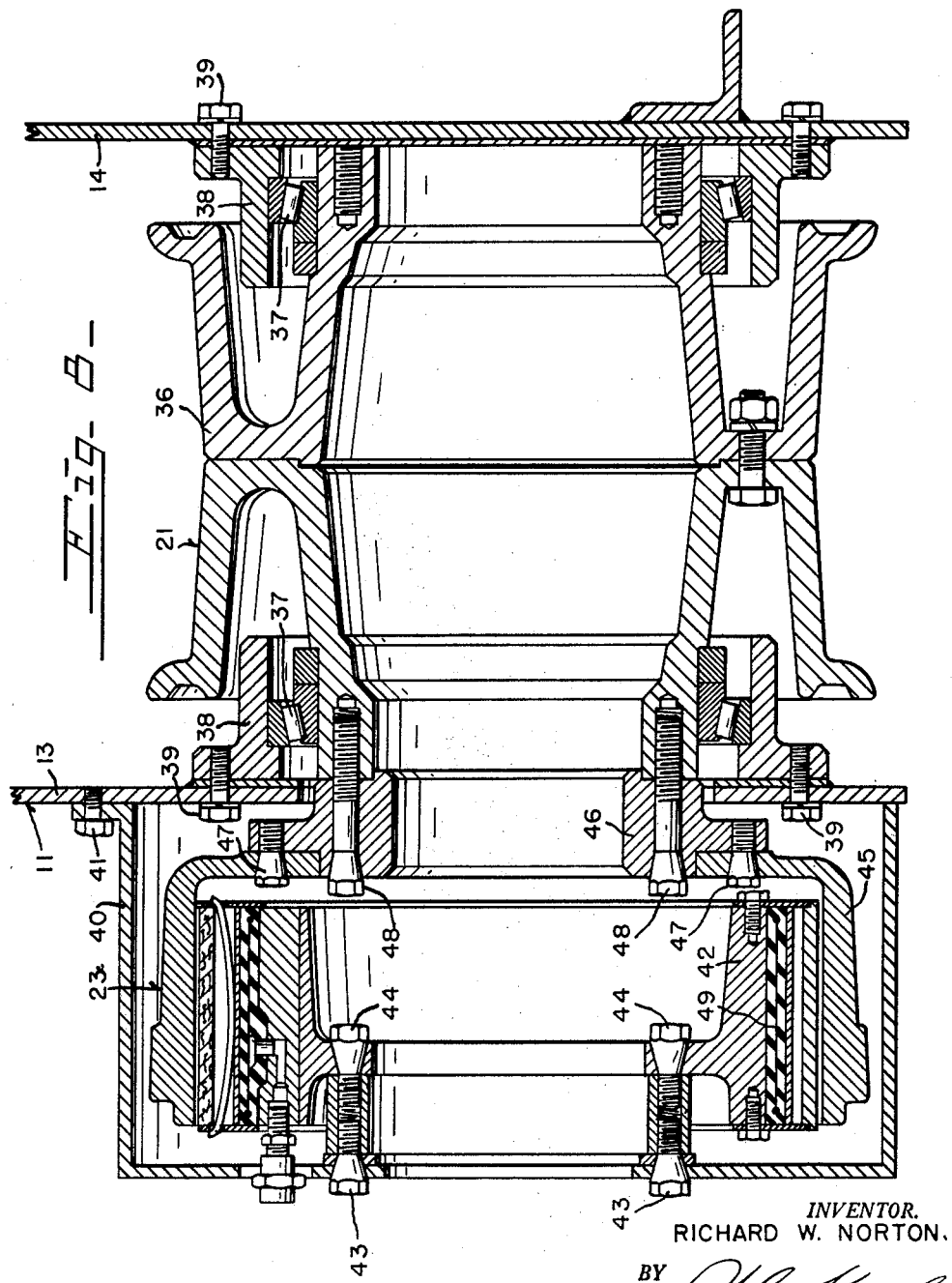

July 20, 1965 R. W. NORTON 3,195,861
TANDEM TAXI TENDER FOR AIRPLANES
Filed April 11, 1963 7 Sheets-Sheet 6
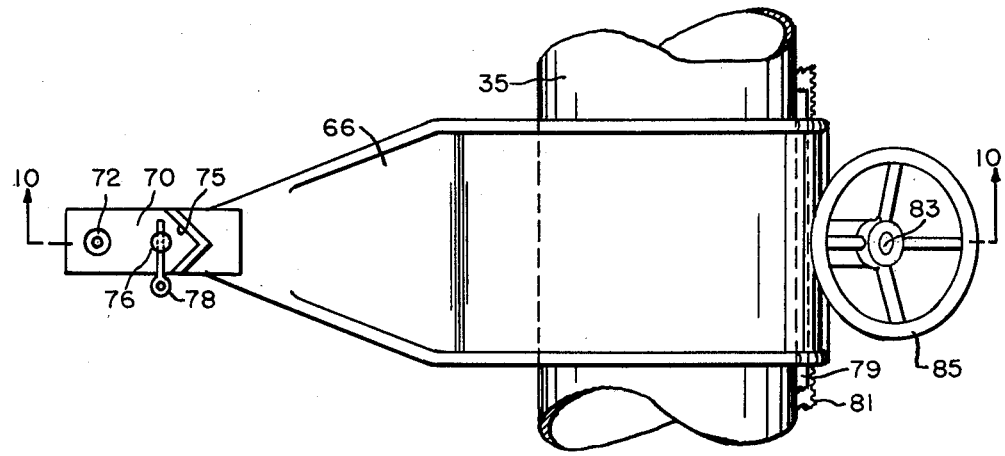
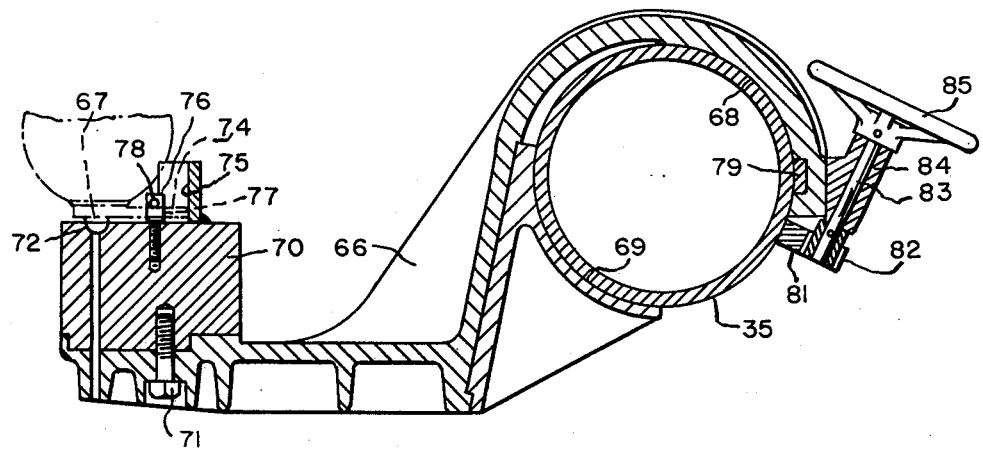
INVENTOR.
RICHARD W. NORTON.
BY
ATTORNEY.

INVENTOR.
RICHARD W. NORTON.
BY
ATTORNEY.

United States Patent Office 3,195,861
Patented July 20, 1965

3,195,861
TANDEM TAXI TENDER FOR AIRPLANES
Richard W. Norton, Cincinnati, Ohio, assignor to General Aeromation, Inc., Cincinnati, Ohio, a corporation of Ohio
Filed Apr. 11, 1963, Ser. No. 272,255
2 Claims. (Cl. 254—2)

This invention relates to a relatively light-weight twin-drive vehicle for moving airplanes while not in flight particularly airplanes with tricycle type landing gears, without the use of the airplane's turbine engines, or other motive or towing power sources. The movement of multi-engined airplanes on the ground, particularly jet-engine propelled airplanes, has become a real and vexing problem, in that the use of jet-engines on the ground is not only very expensive, but incurs many problems due to the great blast noises at disturbingly high frequencies, and the violent air disturbances caused by the jet engines. Because the propulsive efficiencies of jet engines are extremely low at ground movement speeds, further because the overall weight of modern long range jet airplanes has increased enormously in the past decade, thereby greatly increasing the rolling resistance of the heavily loaded tires, the jet engines must run as high as eighty percent full-open throttle-setting to start the taxi roll, thereby consuming very large quantities of jet fuel and producing fumes, smoke and tremendous noise.

My improved vehicle is designed to move under the fuselage and wings of a tricycle type landing gear airplane, and be readily attached to the main landing gears of the airplane or the jacking terminals very near its center of gravity and center of rolling resistance, employing a single operator to perform all operations of positioning the vehicle, attaching to the airplane and maneuvering the airplane in any direction regardless of the conditions of the terrain on which it rests, and taxiing the airplane safely at maximum allowable taxi speeds.

In this invention the elevating structure is hydraulically operated and positioned between a pair of wheels mounted in each chassis with one wheel in each chassis power driven and all four wheels provided with brakes. The elevating structures are connected by a transverse member which supports adjustable arms for engaging the airplane. The landing gears of the various models of commercial jet airplanes vary in the distance the landing gears are spaced from each other. Therefore, I have provided simple means for moving the adjustable arms on the transverse member to quickly and simply adjust the arms to position the arms in alignment with the jack points on the respective landing gears. The arms when in adjusted position are rigidly clamped on the transverse member to hold the airplane in fixed relation to the vehicle. The steering is accomplished by differential power and brake application, similar to the application on a multiple engine airplane. Each chassis is independently driven individually or in unison to permit the vehicle to be maneuvered into position in respect to the landing gears of a multiple engine airplane.

The object of my invention is to provide a vehicle capable of moving and making highly mobile an airplane on the ground and having means for attaching the vehicle to an airplane at its main landing gears, transferring part of the airplane's weight to the vehicle to make a rigid and reliable connection to the airplane, which is also quickly detachable by reversing the weight transfer procedure, without restoring to time consuming and difficult to attach bolted or pinned connection methods, and to also induce traction, and by means of the power of the vehicle and without the aid of any of the airplane's systems or components maneuvering the airplane in any and all directions.

A further object of my invention is to provide a means of moving a tricycle landing gear type airplane by applying the moving forces to the main landing gears of such airplane at or near the true center of rolling resistance and center of mass of the airplane, thereby greatly increasing the effectiveness of the vehicle's moving forces applied to such airplane.

A further object of this invention is to provide a pair of spaced apart chassis supporting an elevating structure on each chassis and said elevating structures connected by a transverse member.

A further object of this invention is to provide adjustable arms on the transverse member for engagement with the main landing gears of an airplane.

A further object is to provide hydraulic means for raising and lowering the transverse member supporting the attaching arms relative to the power chassis.

A further object is to control the individual power and brake application from a single operating position.

A further object is to control the respective elevating mechanism in each chassis concurrently from a single operating position.

My invention will be further readily understood from the following description and claims, and from the drawings, in which latter:

FIG. 1 is a plan view of my improved tandem taxi tender.

FIG. 2 is a rear view of the same.

FIG. 3 is a side view of the same.

FIG. 4 is a view of the elevating mechanism, taken in the plane of the line 4—4 of FIG. 3, with the elevating structure in raised position.

FIG. 5 is a detailed vertical section of the elevating structure, taken in the plane of the line 5—5 of FIG. 6.

FIG. 6 is a detail horizontal section, taken in the plane of the line 6—6 of FIG. 4.

FIG. 8 is an enlarged section of the free wheel mounting, taken in the plane of the line 8—8 of FIG. 1.

FIG. 9 is an enlarged plan detail of one of the adjustable arms on the transverse member.

FIG. 10 is a vertical cross-section of the arm, taken in the plane of the line 10—10 of FIG. 9.

Figure 7:
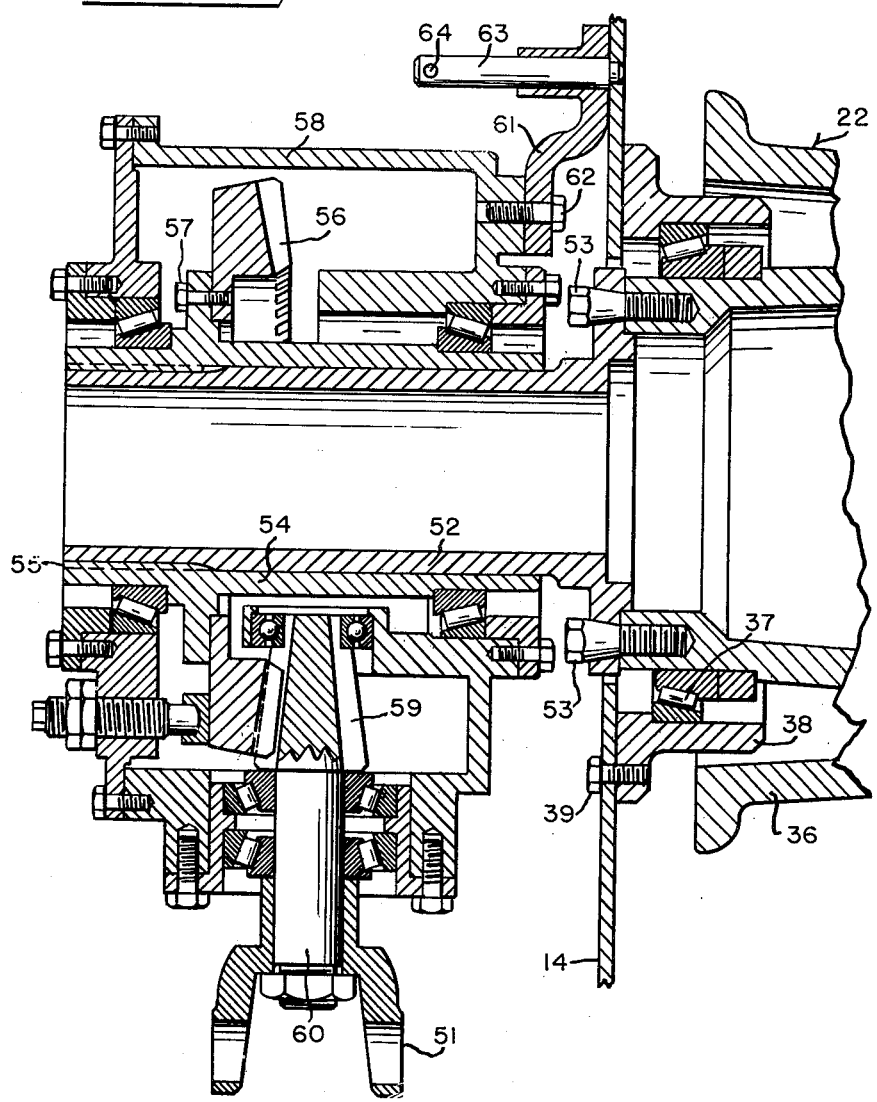
FIG. 7 is an enlarged detail section of the drive mechanism, taken in the plane of the line 7—7 of FIG. 11.

My improved taxi tender comprises a pair of chassis 11 and 12. Each chassis has side frames 13 and 14 connected by end plates 15. A cab 16 for the operator is secured to the forward end of the chassis 11 and has all the controls for the motors and hydraulic pumps therein to permit the operator to maneuver the vehicle and raise or lower the arms engaging the airplane as well as applying the brakes for each wheel. Each chassis also supports a motor 17, a hydraulic pump 18, a fluid reservoir 19 and a fuel tank 20.

Wheels 21 and 22 are mounted in each chassis, with the rear wheels 22 driven by the motors 17. The forward wheels 21 are free to rotate and all of the wheels are provided with brakes 23. Intermediate the wheels on each chassis is a square sleeve 25 bolted to the respective side frames 13 and 14 by bolts 26. A second square sleeve 27 is slidable in the sleeve 25 and is bolted at its upper end to a supporting structure 28 as by bolts 29. A hydraulic cylinder 30 is supported on a plate 31 secured to the base of the sleeve 25. A connecting rod 32 extends upwardly from a piston 33 and is bolted to the supporting structure 28 as at 34. A transverse member 35 is welded to the supporting structure 28 on each chassis to form a rigid connection between the supporting structures. The transverse member 35 maintains the respective chassis 11 and 12 in alignment.

The forward wheel 21 in each chassis, shown in detail in FIG. 8, comprises a wheel hub 36 on which a suitable inflatable tire is mounted. The hub 36 is supported on bearings 37 retained in bearing supports 38 secured to the side frames 13 and 14 by bolts 39. The hydraulic brake 23 comprises a housing 40 bolted to the side frame 13 by bolts 41 and supports a non-rotative member 42 bolted to the housing 40 by bolts 43 and 44. An external member 45 is bolted to a ring 46 by bolts 47. The ring 46 in turn is bolted to the wheel hub by bolts 48. Interposed between the members 42 and 45 is the hydraulic brake 49.

When it is necessary to change a tire, the bolts 41 and 43 are removed to remove the housing 40 and the bolts 48 are removed to free the brake assembly from the wheel. The bolts 39 are then removed and the wheel and its bearings can be lifted from the chassis. The reverse action takes place to replace the wheel.

Figure 11:
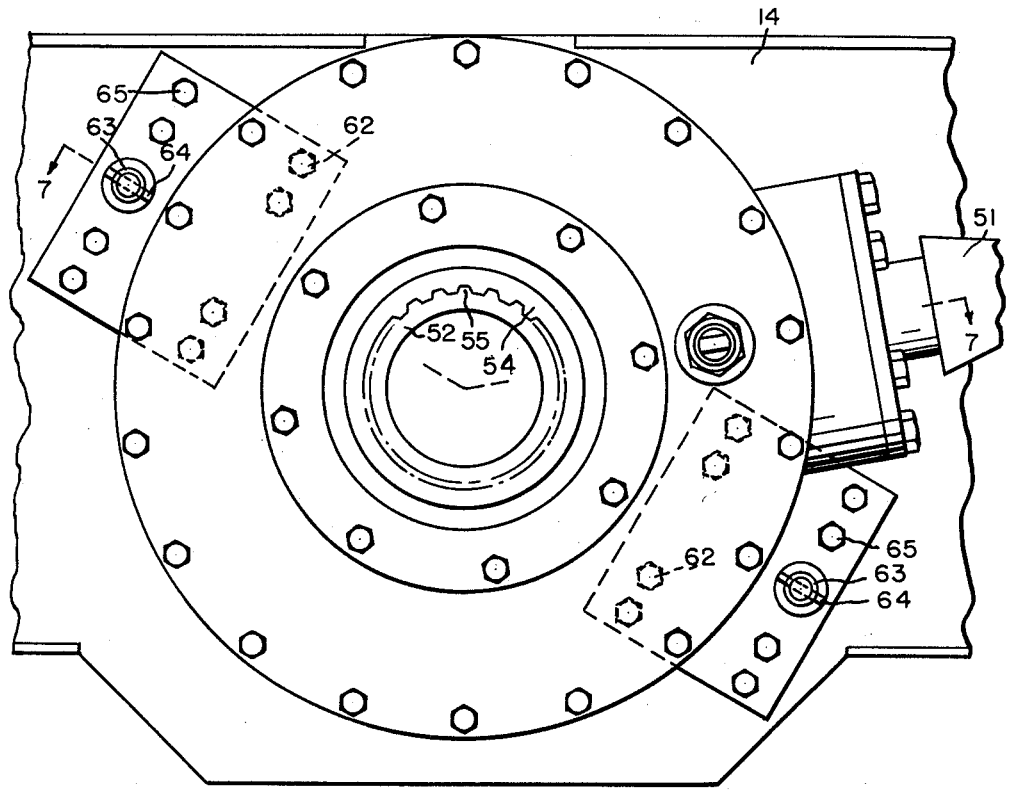
FIG. 11 is an enlarged end view of the wheel drive.

The rear wheels 22 in each chassis are driven by the motors 17 through a transmission 50 which is coupled to the wheel drive by a universal joint 51. (See FIGS. 7 and 11.)

The rear wheel 22 has a hub 36 similar to the hub on the forward wheel on which a suitable inflatable tire is mounted and the hub is supported on bearings 37 retained in bearing supports 38 secured to the side frames 13 and 14 by bolts 39. A sleeve 52 extends outwardly from one side of the wheel hub and is bolted thereto by bolts 53. A second sleeve 54 is splined at 55 to the sleeve 52 and has a ring gear 56 bolted thereto as at 57. A housing 58 encompasses the ring gear 56 and its driving pinion gear 59, the shaft 60 of which is secured to one portion of the universal joint 51. Suitable bearings are interposed between the housing and rotating shaft and sleeve. Plates 61 are bolted to the housing 58 as at 62 and pins 63 welded to the frame 14 extend outwardly with a limiting cross-pin 64 adjacent the ends of the pins. The plates 61 are bolted to the frame 14 by bolts 65. When it is necessary to change a rear tire, the bolts 65 are removed and the drive unit is moved outwardly limited by the cross-pins 64 with the outer sleeve 54 sliding on the sleeve 52. The bolts 53 and 39 can then be removed and the wheel and its bearings lifted out of the chassis. The wheel is replaced by reversing the procedure.

Commercial jet airplane landing gears vary in the distance the main landing gears are spaced from each other. Therefore, I have provided adjustable transfer arms 66 which can be readily moved on the transverse member 35 to position the arms in alignment with the jack points 67 on the respective landing gears. The arms 66 partially encircle the transverse member, which is tubular in cross-section, bearing against the transverse member at 68 and 69 and have forwardly extending supporting blocks 70 which are bolted to the arms as at 71. The upper face of each block has a recess 72 to engage the jack point 67 of the landing gears. The landing gear has a lug 74 extending rearwardly engaging the stops 75 to position the arm 66 in proper position relative to the jack point. As the arm 66 raises the pin 76 will enter the aperture 77 in the lug 74 and a cross-pin 78 can be inserted in the pin 76 to lock the engaging arm 66 to the airplane. In the event of a flat tire on the airplane, the block 70 can be removed from the arm 66 to permit the arm to be inserted under the jack point to raise the landing gear to replace the tire.

Keys 79 are rigidly secured to the transverse member 35 and the arms 66 engage the keys as at 80 to maintain the arms in position on the transverse member and permit movement of the arms along the transverse member. Gear racks 81 secured to and extending along the transverse member are engaged by pinion gears 82 secured to shafts 83 journalled in bearings 84 extending from the arms 66. Handwheels 85 secured to the shafts 83 are adapted to rotate the pinion gears on the gear racks to move the arms into position to engage the jack points 67 on the respective landing gears. When the adjustable transfer arms 66 are in adjusted position and in engagement with the jack points of the airplane and the transverse member is raised to impose a portion of the weight of the airplane on the vehicle, the engaging faces 68 and 69 will create a pinching action on the transverse member to hold the arms in a rigid fixed position on the transverse member. (See FIGS. 9 and 10.)

Figure 12:
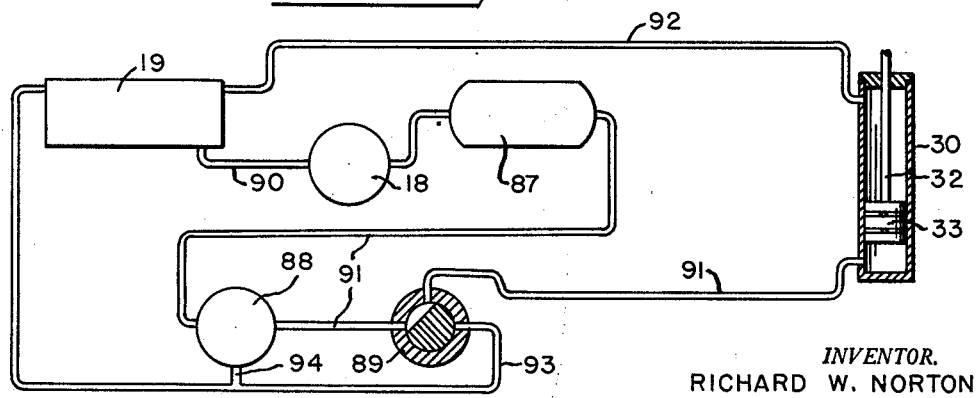
FIG. 12 is a diagrammatic view of the hydraulic system for raising the elevating structure.

In FIG. 12, I have shown one form of hydraulic system for operating the pistons 33 in the cylinders 30 for raising the supporting structure and transverse member. The hydraulic system for each chassis comprises the fluid reservoir 19, hydraulic pump 18, accumulator 87, a pressure holding valve 88, and a control valve 89. The fluid is drawn from the reservoir 19 through a line 90 to the pump 18 connected to the accumulator 87, through a line 91 to the valve 89, to the lower end of the cylinder 30. A line 92 connects the upper end of the cylinder to the reservoir and acts as a breather line. A return line 93 from the valve 89 connects to the reservoir 19. The weight of the structure will cause the piston to descend when the valve 89 is turned to permit the fluid to return to the reservoir 19. The pressure holding valve has a connection 94 to the line 93 to bleed off to maintain a given pressure in the cylinder 30.

When it is desired to move an airplane on the ground, the tandem taxi tender is driven into position in the rear of the airplane, the arms adjusted to the proper spaced positions to align the arms with the jack points on the respective landing gears. Suitable indicia may be embossed on the transverse member to aid in locating the arms for a given airplane. The vehicle is driven forward to position the sockets or recesses 72 under the jack points 67. The control valves 89 which are operated in unison from the cab 16 are turned to cause fluid under pressure to enter the cylinder 30 below the pistons 33. The pistons through the connecting rods 32 cause the supporting structures to rise, raising the transverse member and the arms. The arms make positive connection with the jack points on the landing gears and the vehicle assumes part of the weight of the airplane, the amount being governed by the setting of the pressure control valve 88.

The operator in the cab 16 has complete control of the airplane and by applying differential power and brake application to the wheels, the airplane can be moved in any direction to any location without employing the airplane's engines.

Having thus fully described my invention, what I claim as new and desire to secure by Letters Patent is:

1. A tandem taxi tender for airplanes comprising;
  (a) a pair of spaced chassis,
  (b) each chassis having a pair of side frames,
  (c) a pair of wheels removably mounted in each of said chassis,
  (d) an elevating structure supported in each of said side frames between said wheels comprising a square sleeve clamped in each side frame with a sliding member of square configuration and non-rotatably slidable therein,
  (e) hydraulic pistons connected to said sliding members for operating said elevating structures,
  (f) a transverse member rigidly and non-rotatably secured to said sliding members, and
  (g) arms extending forward and adjustable on said transverse member for forming a rigid connection with the main landing gears of an airplane.

2. In a tandem taxi tender for airplanes comprising;
  (a) a pair of spaced power driven chassis, (b) an elevating structure on each chassis,
(c) a transverse member connecting said elevating structures,
(d) a pair of laterally extending arms provided with socket means for connection with the landing gears of an airplane,
(e) said arms having flexible means partially encircling said transverse member,
(f) said arms movable on said transverse member,
(g) a gear and gear rack for moving said arms on said transverse member, and
(h) the said socket means and flexible means being so formed and positioned relative to each other that the weight of the airplane when the elevating structures are raised will lock said flexible means on said transverse member with a pinching action.

References Cited by the Examiner
UNITED STATES PATENTS

| | | | |
|---|---|---|---|
| Re. 24,230 | 10/56 | Pearne | 254—8.2 |
| 526,715 | 10/94 | Knight | 254—89 X |
| 2,357,633 | 9/44 | Cowgill | 254—2.2 X |
| 2,585,790 | 2/52 | Kelley | 180—6.7 |
| 2,612,355 | 9/52 | Thompson. | |
| 2,639,825 | 5/53 | Eakin | 254—124 X |
| 2,980,270 | 4/61 | Elliott et al. | 214—334 X |
| 3,078,942 | 2/63 | Wiebe | 254—2.2 X |
| 3,091,431 | 5/63 | Arnes et al. | 254—2.4 |

OTHER REFERENCES

Rotary Lift pamphlet No. 20–M 11–50, Catalog 121, received July 12, 1951, 12 pages.

DONLEY J. STOCKING, *Primary Examiner.*